US010057907B2

(12) United States Patent
Lee et al.

(10) Patent No.: US 10,057,907 B2
(45) Date of Patent: Aug. 21, 2018

(54) SCHEME FOR TRANSMITTING REFERENCE SIGNAL IN WIRELESS COMMUNICATION SYSTEM

(71) Applicant: Samsung Electronics Co., Ltd., Gyeonggi-do (KR)

(72) Inventors: Heun-Chul Lee, Gyeonggi-do (KR); Dong-Sik Kim, Gyeongsangbuk-do (KR); Hyo-Jin Lee, Gyeonggi-do (KR); Jong-Han Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 107 days.

(21) Appl. No.: 14/721,579

(22) Filed: May 26, 2015

(65) Prior Publication Data
US 2015/0341942 A1 Nov. 26, 2015

Related U.S. Application Data

(60) Provisional application No. 62/002,452, filed on May 23, 2014.

(30) Foreign Application Priority Data

Feb. 11, 2015 (KR) .......................... 10-2015-0021130
Mar. 13, 2015 (KR) .......................... 10-2015-0034799

(51) Int. Cl.
*H04L 1/00* (2006.01)
*H04W 72/08* (2009.01)
(Continued)

(52) U.S. Cl.
CPC .......... *H04W 72/082* (2013.01); *H04B 7/068* (2013.01); *H04B 7/0619* (2013.01);
(Continued)

(58) Field of Classification Search
CPC ... H04L 5/0048; H04L 5/0051; H04L 5/0073; H04L 25/0226; H04L 1/0026;
(Continued)

(56) References Cited

U.S. PATENT DOCUMENTS 9,337,970 B2* 5/2016 Hammarwall ........ H04L 1/0026
2011/0194551 A1* 8/2011 Lee ...................... H04B 7/0626
370/342

(Continued)

FOREIGN PATENT DOCUMENTS

KR 1020120012867 2/2012
KR 1020140057344 5/2014

*Primary Examiner* — Marsha D. Banks Harold
*Assistant Examiner* — Elton Williams
(74) *Attorney, Agent, or Firm* — The Farrell Law Firm, P.C.

(57) ABSTRACT

Methods, systems, apparatuses, evolved NodeB (EnBs), User Equipment (UE), and chip sets for all of the same, in cellular communication systems are described. One method for a UE includes receiving a Channel State Information Reference Signal (CSI-RS) transmitted by an eNB according to a pattern in a time-frequency resource grid determined based on the transmission scheme of the eNB, measuring the state of the transmission channel using the CSI-RS, generating channel state information based on the measuring, and transmitting the channel state information as feedback. The UE receives a downlink signal including data and a Cell-specific Reference Signal (CRS) from the eNB and estimates the transmission channel using the CRS and then acquires the data using the estimated channel.

20 Claims, 10 Drawing Sheets

(51) Int. Cl.
*H04W 24/08* (2009.01)
*H04W 72/04* (2009.01)
*H04L 5/00* (2006.01)
*H04B 7/06* (2006.01)
*H04L 1/06* (2006.01)
*H04L 25/02* (2006.01)

(52) U.S. Cl.
CPC ......... *H04B 7/0623* (2013.01); *H04B 7/0626* (2013.01); *H04B 7/0632* (2013.01); *H04B 7/0639* (2013.01); *H04B 7/0667* (2013.01); *H04B 7/0669* (2013.01); *H04B 7/0671* (2013.01); *H04B 7/0684* (2013.01); *H04B 7/0689* (2013.01); *H04L 1/06* (2013.01); *H04L 5/0048* (2013.01); *H04L 25/02* (2013.01); *H04W 24/08* (2013.01); *H04W 72/042* (2013.01); *H04L 1/0026* (2013.01)

(58) Field of Classification Search
CPC .. H04B 7/0626; H04B 7/0639; H04B 7/0417; H04B 7/0619; H04B 7/0632; H04B 7/068; H04B 7/0689; H04B 17/345
See application file for complete search history.

(56) References Cited

U.S. PATENT DOCUMENTS

| | | | |
|---|---|---|---|
| 2011/0244877 A1* | 10/2011 | Farajidana | H04L 5/0023 455/452.2 |
| 2013/0070719 A1* | 3/2013 | Xu | H04L 5/005 370/329 |
| 2014/0226611 A1 | 8/2014 | Kang et al. | |
| 2015/0078303 A1* | 3/2015 | Jongren | H04L 1/0026 370/329 |
| 2015/0230259 A1* | 8/2015 | Park | H04B 7/0626 370/329 |

* cited by examiner

__US 10,057,907 B2__

SCHEME FOR TRANSMITTING REFERENCE SIGNAL IN WIRELESS COMMUNICATION SYSTEM

PRIORITY

This application claims priority under 35 U.S.C. § 119(e) to U.S. Provisional Patent Application Ser. No. 62/002,452, filed on May 23, 2014, and under 35 U.S.C. § 119(a) to Korean Patent Application Nos. 10-2015-0021130 and 10-2015-0034799, filed on Feb. 11, 2015 and Mar. 13, 2015, respectively, all of which are incorporated herein by reference for all purposes as if fully set forth herein.

BACKGROUND OF THE DISCLOSURE

1. Field of the Disclosure

The present disclosure relates to a scheme for transmitting a reference signal in a wireless communication system, and more particularly to a method and an apparatus for transmitting a reference signal in the light of an interference signal in a cellular communication system.

2. Description of the Related Art

In next generation wireless communication systems (for example, the Long Term Evolution-Advanced (LTE-A) system), cell coverage is relatively small when compared to conventional cellular environments. When various types of cells, such as conventional cells and femtocells operate in the same environment, non-uniform cell distribution occurs.

A User Equipment (UE) may receive not only a desired signal (also referred to as a "required signal") from a serving cell, but also an undesired signal (also referred to as an "interference signal") from another or "interfering" cell. In such an environment, inter-cell interference is the largest factor increasing packet error, thus reducing performance in the UE.

In an LTE wireless communication system, an evolved NodeB (eNB) transmit a reference signal, before transmitting data to the UE, such as a Channel State Information-Reference Signal (CSI-RS) in order to allow the UE to measure channel quality of the serving cell. Further, the eNB may use CSI-Interference Measurement (IM) to allow the UE to measure channel quality in consideration of channels of adjacent cells.

The UE uses the CSI-IM to determine a Channel Quality Indicator (CQI) and transmits feedback of the channel quality information to the eNB. The eNB transmits data to the UE based on the feedback. At this time, the eNB may also transmit a Cell-specific Reference Signal (CRS) on an Orthogonal Frequency Division Multiplex (OFDM) domain together with the data in order to allow the UE to estimate a channel (that is, the channel of a desired signal) required when the UE receives the data.

In order for the next generation UE (for example, the Long Term Evolution-Advanced (LTE-A) UE) to most efficiently remove an interference signal from the received signal to reduce a packet error of the desired signal, the UE needs the transmission scheme information of the interference signal as well as the channel information of the interference signal. While transmission scheme information of the interference signal may be estimated using the CSI-IM-, such estimation is limited because the CSI-IM reuses the CSI-RS resource pattern which is not suitable to estimate transmission schemes. A CSI-RS pattern is defined by location (or distribution) of resource element(s) used for transmitting the CSI reference signals.

Thus, in order to solve interference problems, there is a need for methods, apparatus, and systems for accurately transmission schemes of estimating interference signals received by the next generation UE.

SUMMARY

In order to overcome the limitations of the CSI-IM, one aspect of the present disclosure provides a new CSI-RS pattern that first considers a transmission scheme and provides a method of maximizing estimation performance of the transmission scheme information of the interference signal by using the provided CSI-RS pattern. Another aspect of the present disclosure provides a new RS for estimating transmission scheme information of an interference signal, which is used by the next generation UE for removing the interference signal.

According to another aspect of the present disclosure, the UE can determine accurate channel state information and, accordingly, improve system capacity. According to a further aspect of the present disclosure, the UE can improve an estimation capability of a transmission scheme based on Space Frequency Block Codes (SFBC), SFBC Frequency-Switched Transmit Diversity (SFBC-FSTD), or Cyclic Delay Diversity (CDD) Spatial Multiplexing (CDD-SM). In such an aspect, the UE can minimize a false alarm detection error and a miss alarm detection error caused by an interference signal in a transmission scheme including at least one of SFBC, SFBC-FSTD, and CDD-SM. According to a still further aspect of the present invention, the UE can improve an interference removing capability by accurately estimating a transmission scheme of the interference signal and, accordingly, increase its packet error estimating capability.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE PRESENT DISCLOSURE

Figure 1:
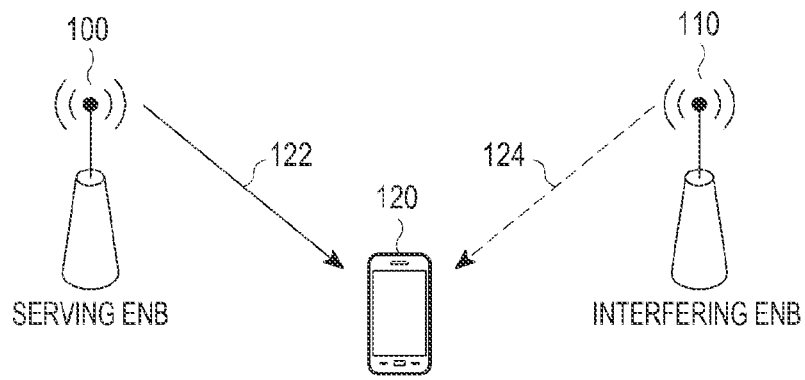
FIG. 1 illustrates an example of a system in which a UE receives signals from a serving cell and an interfering cell.

Hereinafter, embodiments of the present disclosure will be described in detail with reference to the accompanying drawings. In the following description of the present disclosure, detailed descriptions of known configurations or functions incorporated herein will be omitted when not necessary for one of ordinary skill in the art and/or where such a detailed description may make the subject matter of the present disclosure unclear. Terms described herein are used and/or defined in consideration of the functions of the present disclosure, but the terminology, as well as the specific implementations thereof, may vary according to the intention or convention of a user or operator. Therefore, the definitions of the terms should be determined based on the contents throughout the specification and the knowledge of one of ordinary skill in the art, and not be interpreted so as to limit the overall disclosure or the scope of the claims appended hereto in any way.

In the detailed description of the present disclosure, examples of interpretable meanings of some terms used in the present disclosure are provided; however, those terms are not limited to the examples of the construable meanings which are provided below.

A base station is a main body communicating with a User Equipment (UE), and may be referred to as a BS, a Node B (NB), an eNode B (eNB), an Access Point (AP) or the like.

The user equipment is a subject communicating with the BS, and may be referred to as a UE, a Mobile Station (MS), a Mobile Equipment (ME), a device, a terminal and the like.

In the present disclosure, not only reference signals used in an LTE system such as CSI-RS, CRS, CSI-IM, and the Demodulation-Reference Signal (DM-RS), but also newly defined reference signals such as a "Transmission Mode-Interference Measurement" (TM-IM) and a "Channel State Information-Transmission Mode-Interference Measurement" (CSI-TM-IM) signal will be described.

A Cell-specific Reference Signal (CRS) refers to a reference signal transmitted from an eNB and is used by the UE for estimating a channel (H) for data reception. The CRS has a cell specific characteristic and is transmitted in all downlink subframes and all frequency resource blocks.

A Channel State Information-Reference Signal (CSI-RS) refers to a reference signal transmitted from the eNB and is used by the UE for measuring Channel State Information (CSI) of a serving cell. The CSI-RS is not transmitted in all downlink subframes and is sparsely transmitted to generate relatively smaller overhead in comparison with the CRS.

A Demodulation-Reference Signal (DM-RS) refers to a reference signal transmitted from the eNB and is used by the UE for estimating a Physical Downlink Shared Channel (PDSCH). The DM-RS has a UE-specific characteristic and, accordingly, is transmitted in a resource block allocated for the PDSCH of a UE.

A Channel State Information-Interference Measurement (CSI-IM) refers to a reference signal transmitted from the eNB and is used by the UE for considering an interference signal when measuring channel state information. The CSI-IM is transmitted through the same pattern as that of the CSI-RS. The eNB may transmit a CSI-RS having no transmission power, that is, a zero-power CSI-RS to improve channel state information measurement performance of the interfering cell.

According to one aspect of the present disclosure, a method for a User Equipment (UE) in a cellular communication system is provided, including receiving a Channel State Information Reference Signal (CSI-RS) transmitted according to a pattern in a frequency-time resource grid, the pattern determined by an evolved NodeB (eNB) based on a transmission scheme; measuring a state of a transmission channel with the eNB by using the CSI-RS; generating channel state information based on the measuring; transmitting the channel state information as feedback to the eNB; receiving a Cell-specific Reference Signal (CRS) from the eNB; estimating the transmission channel using the CRS; and acquiring, using the estimated channel, data transmitted on the transmission channel.

According to another aspect of the present disclosure, a method for an evolved NodeB (eNB) in a cellular communication system is provided, including transmitting a Channel State Information Reference Signal (CSI-RS) to a User Equipment (UE) according to a pattern in a time-frequency resource grid determined based on a transmission scheme of the eNB; receiving channel state information of the UE generated using the CSI-RS; and transmitting a downlink signal including data and a Cell-specific Reference Signal (CRS).

According to yet another aspect of the present disclosure, a User Equipment (UE) in a cellular communication system is provided, including a controller that receives a Channel State Information Reference Signal (CSI-RS) transmitted according to a pattern in a time-frequency resource grid determined based on a transmission scheme of an evolved NodeB (eNB), measures a state of a transmission channel with the eNB by using the CSI-RS, generates channel state information based on the measuring, transmits the channel state information as feedback to the eNB, receives a Cell-specific Reference Signal (CRS) from the eNB, estimates the transmission channel using the CRS, and acquires, using the estimated channel, data transmitted on the transmission channel; and a transceiver that receives the CSI-RS, transmits the channel state information, and receives the CRS and transmission channel, under control of the controller.

According to still another aspect of the present disclosure, an evolved NodeB (eNB) in a cellular communication system is provided, including a controller that transmits a Channel State Information Reference Signal (CSI-RS) to a User Equipment (UE) according to a pattern in a time-frequency resource grid determined based on a transmission scheme of the eNB, receives channel state information of the UE generated using the CSI-RS, and transmits a downlink signal including data and a Cell-specific Reference Signal (CRS); and a transceiver that transmits the CSI-RS, receives the channel state information, and transmits the downlink signal, under control of the controller.

According to yet another aspect of the present disclosure, a chip set for a User Equipment (UE) in a cellular communication system is provided, which is configured to receive a Channel State Information Reference Signal (CSI-RS) transmitted according to a pattern in a frequency-time resource grid, the pattern determined by an evolved NodeB (eNB) based on a transmission scheme; measure a state of a transmission channel with the eNB by using the CSI-RS; generate channel state information based on the measuring; transmit the channel state information as feedback to the eNB; receive a Cell-specific Reference Signal (CRS) from the eNB; estimate the transmission channel using the CRS; and acquire, using the estimated channel, data transmitted on the transmission channel.

According to still yet another aspect of the present disclosure, a chip set for an evolved NodeB (eNB) in a cellular communication system is provided, which is configured to transmit a Channel State Information Reference Signal (CSI-RS) to a User Equipment (UE) according to a pattern in a time-frequency resource grid determined based on a transmission scheme of the eNB; receive channel state information of the UE generated using the CSI-RS; and transmit a downlink signal including data and a Cell-specific Reference Signal (CRS).

First, a scheme for defining a CSI-RS resource pattern considering a transmission scheme of the eNB (for example, a transmission diversity transmission scheme using multiple antennas) is described.

FIG. 1 illustrates an example of a system in which a UE receives signals from a serving cell and an interfering cell.

A UE 120 receives not only a desired signal 122 from an eNB 100 (that is, the eNB of the serving cell) but also an interference signal 124 from an eNB 110 (that is, the eNB of an interfering cell).

Figure 2:
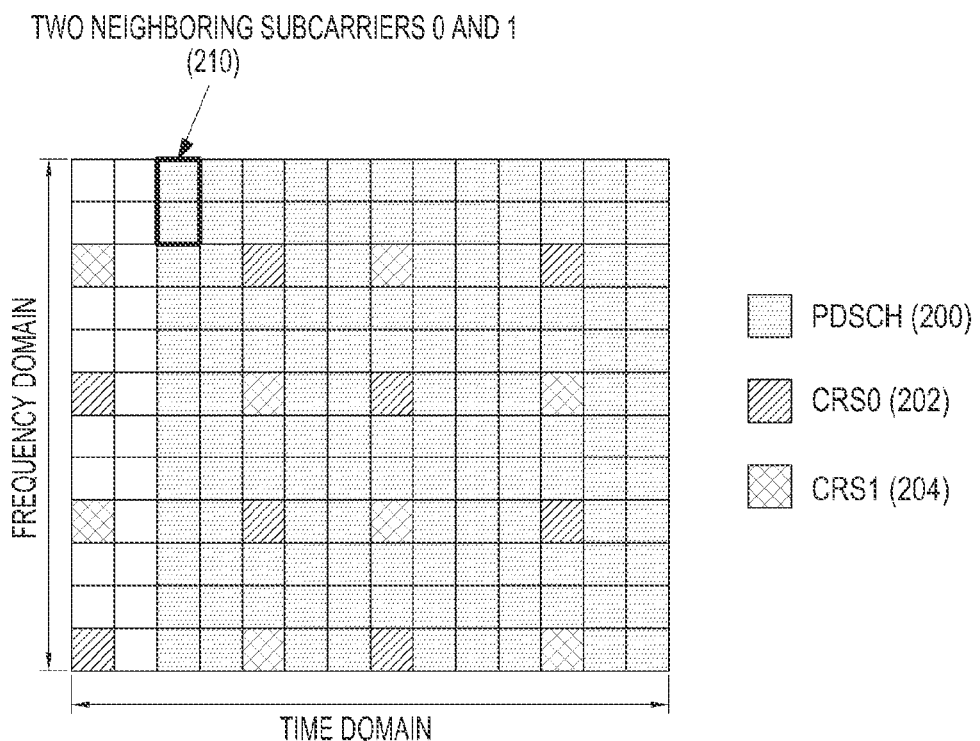
FIG. 2 illustrates an example of interference signals transmitted from an interfering cell.

FIG. 2 illustrates an example of interference signals transmitted from the interfering cell.

As illustrated in FIG. 2, in an LTE system, CRSs 202 and 204 as well as a Physical Downlink Shared Channel (PDSCH) 200 corresponding to a data channel may be transmitted on a frequency-time resource grid, i.e., a resource grid with frequency and time axes.

When transmitting data through the PDSCH 200, the eNB may use various transmission schemes according to a channel environment with the UE. Particularly, a Multiple-Input Multiple-Output (MIMO)-based eNB using multiple antennas may use transmit diversity technology and Spatial Multiplexing (SM) technology. For example, in an LTE system using two transmission antennas, transmit diversity technology based on Space Frequency Block Codes (SFBC) or SM technology based on Cyclic Delay Diversity (CDD) (that is, CDD-SM) may be used. Technologies such as SFBC or CDD-SM are implemented through two neighboring (or adjacent) subcarriers 210 (that is, contiguous on the frequency axis) as illustrated in the example of FIG. 2.

$$\begin{array}{c} \text{port0} \quad \text{port1} \\ \text{subcarrier0} \begin{bmatrix} x_0 & -x_1^* \\ x_1 & x_0^* \end{bmatrix} \end{array} \qquad \text{Equation (1)}$$

Equation (1) represents signals transmitted to antenna ports 0 and 1 through two neighboring carriers 210 (for example, resource regions defined by subcarriers 0 and 1) in an SFBC transmission scheme. Based on Equation (1), signals $x_0$ and $-x_1^*$ are transmitted on subcarrier 0 to antenna ports 0 and 1, respectively, and signals $x_1$ and $x_0^*$ are transmitted on subcarrier 1 to antenna parts 0 and 1, respectively.

Each of Equations (2) and (3) represents signals transmitted through two neighboring carriers 0 and 1 in a CDD-SM transmission scheme.

$$\begin{array}{c} \text{port0} \\ \text{port1} \end{array} \frac{1}{2} \begin{bmatrix} 1 & 1 \\ 1 & -1 \end{bmatrix} \begin{bmatrix} x_0 \\ x_1 \end{bmatrix} \qquad \text{Equation (2)}$$

$$\begin{array}{c} \text{port0} \\ \text{port1} \end{array} \frac{1}{2} \begin{bmatrix} 1 & 1 \\ -1 & 1 \end{bmatrix} \begin{bmatrix} x_2 \\ x_3 \end{bmatrix} \qquad \text{Equation (3)}$$

Equation (2) shows an example of a CDD-SM transmission scheme in which signals are transmitted on carrier 0 to antenna ports 0 and 1, and Equation (3) shows an example of a CDD-SM transmission scheme in which signals are transmitted on carrier 1 to antenna ports 0 and 1. Signals 1/2(x0+x1) and 1/2(x0−x1) are transmitted on carrier 0 to antenna ports 0 and 1, respectively, and signals 1/2(x2+x3) and 1/2(−x2+x3) are transmitted on carrier 1 to antenna ports 0 and 1.

An LTE system using four transmission antenna ports has expanded transmit diversity and spatial multiplexing. The transmit diversity technology may, for example, combine SFBC and Frequency-Switched Transmit Diversity (FSTD) by using four antenna ports 0, 1, 2, and 3 and four neighboring carriers (for example, carriers 0, 1, 2, and 3).

For instance, Equations (4)(a) and (4)(b) represent signals when carriers 0, 1, 2, and 3 and four transmission antenna ports 0, 1, 2, and 3 are used in transmit diversity technology.

$$\begin{array}{c} \text{port0} \quad \text{port2} \\ \text{subcarrier0} \begin{bmatrix} x_0 & -x_1^* \\ x_1 & x_0^* \end{bmatrix} \end{array} \qquad \text{Equation (4)(a)}$$

$$\begin{array}{c} \text{port1} \quad \text{port3} \\ \text{subcarrier2} \begin{bmatrix} x_2 & -x_3^* \\ x_3 & x_2^* \end{bmatrix} \end{array} \qquad \text{Equation (4)(b)}$$

Equations (1) to (4)(b) represent signals in transmission schemes using multiple antennas transmitting signals through neighboring carriers. In order to accurately measure channel state information and transmission scheme information of the received signal, estimation by considering signals received through neighboring (contiguous) carriers on the frequency axis is required.

Figure 3:
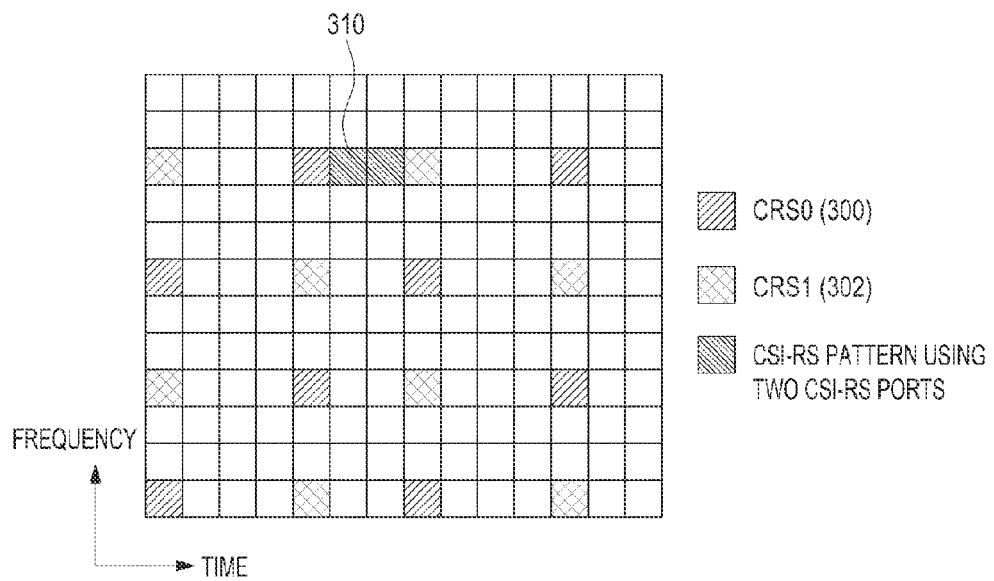
FIG. 3 illustrates an example of a pattern for two CSI-RS ports in an LTE system.

FIG. 3 illustrates an example of a CSI-RS pattern for two CSI-RS ports in a time-frequency resource grid for one Resource Block (RB) consisting of resource elements (REs) defined by fourteen symbols on the time axis and twelve subcarriers on the frequency axis in an LTE system.

In FIG. 3, CRS#0 signal 300 is for CRS port 0, CRS#1 signal 302 is for CRS port 1, and CSI-RS symbols 310 are for two CSI-RS ports.

Figure 4:
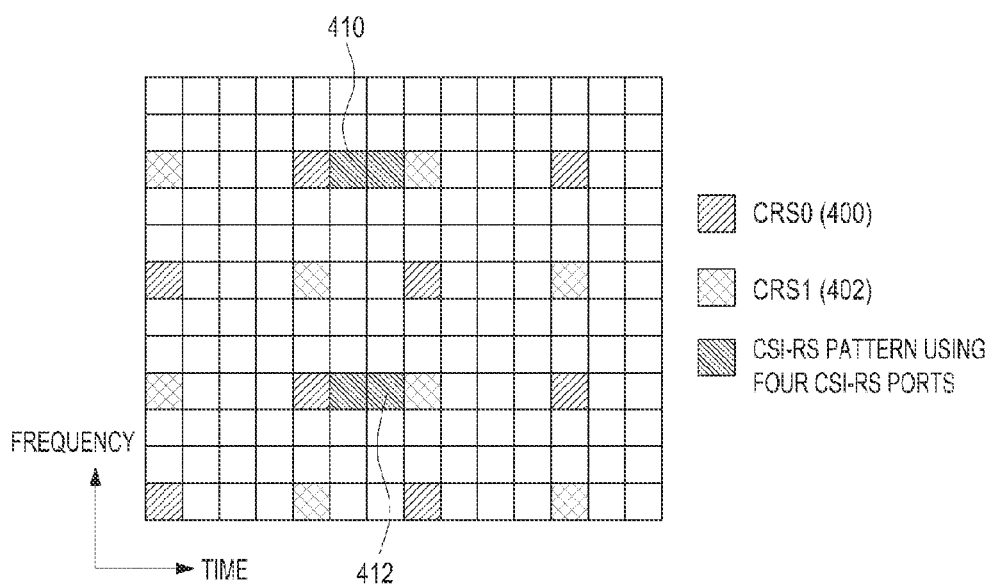
FIG. 4 illustrates an example of a pattern for four CSI-RS ports in an LTE system.

FIG. 4 illustrates an example of a CSI-RS pattern for four CSI-RS ports in a time-frequency resource grid for one RB in an LTE system.

In FIG. 4, CRS#0 signal 400, CRS#1 signal 402, and CSI-RS symbols 410 and 412 for four CSI-RS ports are shown.

Referring to the CSI-RS patterns 310, 410, and 412 illustrated in FIGS. 3 and 4, it may be noted that CSI-RS symbols span in a time axis direction in a signal subcarrier of a time-frequency resource grid. That is, the CSI-RSs 310, 410, and 412 of FIGS. 3 and 4 are transmitted through two symbols neighboring (contiguous) on the time axis in one subcarrier. The CSI-RS patterns of FIGS. 3 and 4 are contrary to the characteristic that transmitted signals are arranged to span (or to be consecutive) on the frequency axis in the same time (that is, the same symbol) in a transmission scheme using a transmit diversity.

Figure 5:
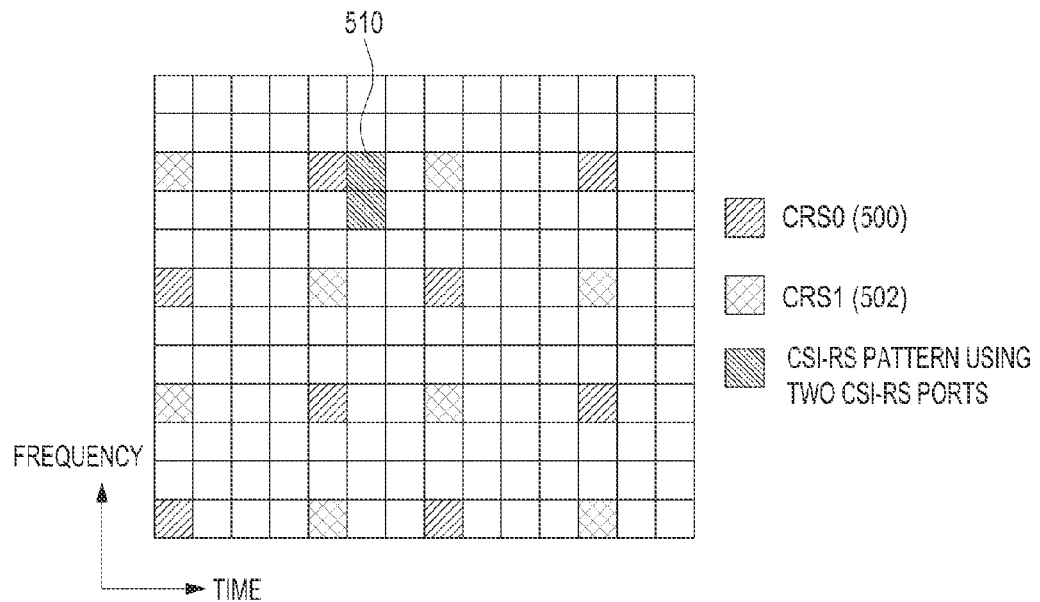
FIG. 5 illustrates an example of a pattern for two CSI-RS ports in an LTE system.
Figure 6:
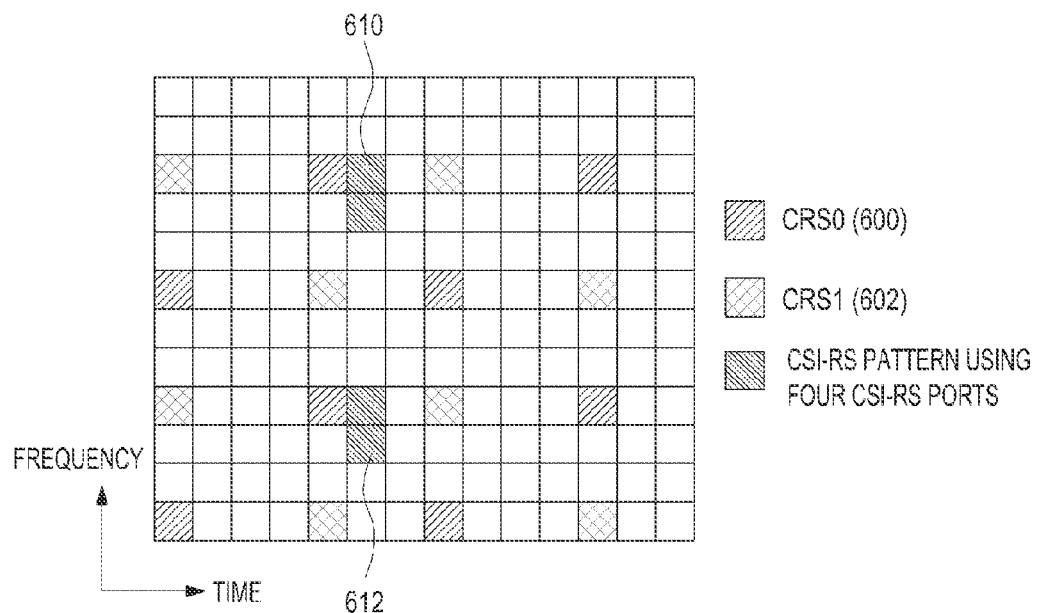
FIG. 6 illustrates an example of a pattern for four CSI-RS ports in an LTE system.

Accordingly, the present disclosure provides a method of maximizing channel state information measurement performance and transmission scheme information estimation performance of signals by defining CSI-RS patterns in consideration of a transmission scheme of the transmitter. Specifically, the present disclosure provides a method of transmitting two or more CSI-RS symbols relevant to each other through two or more subcarriers contiguous on the frequency axis. FIGS. 5 and 6 illustrate CSI-RS patterns designed in consideration of transmission schemes in an LTE system.

FIG. 5 illustrates another example of the CSI-RS pattern for two CSI-RS ports in a time-frequency resource grid for one RB defined by fourteen symbols on the time axis and twelve subcarriers on the frequency axis in an LTE system. In FIG. 5, CRS#0 signal 500, CRS#1 signal 502, and CSI-RS symbols 510 for two CSI-RS ports are transmitted as shown.

FIG. 6 illustrates another example of a CSI-RS pattern for four CSI-RS ports in a time-frequency resource grid for one RB in an LTE system.

In FIG. 6, CRS#0 signal 600, CRS#1 signal 602, and CSI-RS symbols 610 and 612 for four CSI-RS ports are transmitted as shown. CSI-RS patterns 510, 610, and 612 illustrated in FIGS. 5 and 6 span in the frequency axis direction but occupy the same time resource (i. e., symbol) of the time-frequency resource grid. That is, the CSI-RSs 510, 610, and 612 of FIGS. 5 and 6 are transmitted through two neighboring (contiguous) frequency subcarriers but in only one time resource (that is, same symbol).

The eNB according to the present disclosure may transmit CSI-RSs by using the patterns illustrated in FIGS. 5 and 6, and the UE may measure channel state information by using the CSI-RSs and transmit feedback to the eNB. For the correspondence of characteristics as illustrated in FIGS. 5 and 6, CSI-RS patterns defined in consideration of the transmission scheme of the transmitter can maximize performance by improving channel state information measurement and transmission scheme information estimation.

Figure 7:
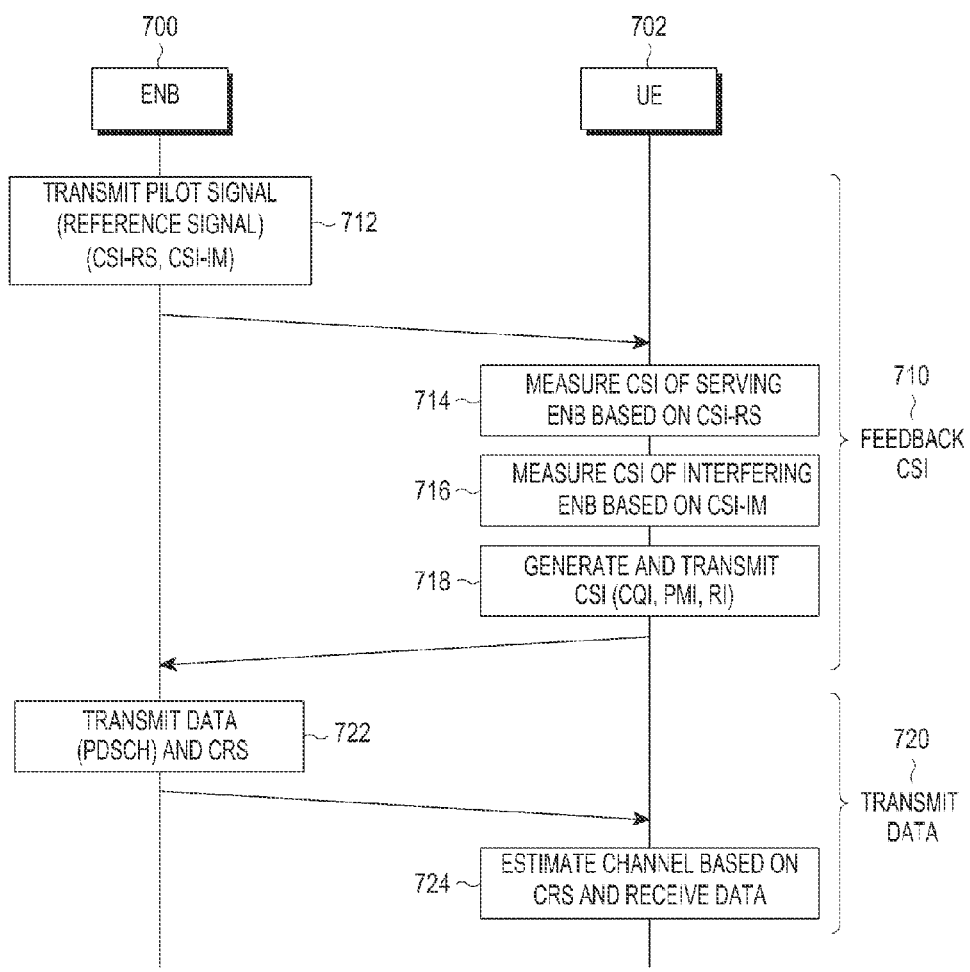
FIG. 7 illustrates an example of operations of an eNB and a UE in a wireless communication system using CSI-RSs of a resource pattern according to the present disclosure.

FIG. 7 illustrates an example of operations of the eNB and the UE in a wireless communication system using CSI-RSs of a pattern according to the present disclosure.

The process in FIG. 7 may be divided into two parts, that is, a CSI feedback part 710 and a data transmission part 720. In the feedback part, UE 702 provides feedback channel state information by using a reference signal transmitted from eNB 700 in step 712, while, in the data transmission part 720, the eNB 700 transmits data by using the channel state information fed back by the UE in the first part 710. The operation of FIG. 7 is described below in more detail.

In step 712, the eNB 700 transmits a pilot signal (that is, a reference signal) used by the UE 702 for measuring the channel state. The reference signal may be, for example, a CSI-RS or a CSI-IM. More specifically, the UE 702 measures the channel state of the serving cell using the CSI-RSs transmitted from the serving eNB 700, and measures the channel state of an interfering cell by using the CSI-IM transmitted by the serving eNB and/or other interfering eNBs. In step 714, UE 702 uses the CSI-RS received from the serving eNB 700 to measure the serving cell channel state. In step 716, UE 702 uses the CSI-IM received from the serving eNB and/or other interfering eNBs to measure the interfering cell channel state. In step 718, UE 702 generates and transmits serving cell channel state information (CSI) to serving eNB 700 based on the measurements in step 714 and 716.

The CSI fed back to the eNB 700 in step 718 may include a Channel Quality Indicator (CQI), an indicator indicating a Modulation and Coding Scheme (MCS), a Rank Indicator (RI), and/or a Precoding Matrix Indicator (PMI).

Using the CSI received in step 718, eNB 700 may determine a transmission scheme for the UE 702. For example, in an LTE system, the CRS-based transmission mode may correspond to TM 1 through TM 6. In step 722, eNB 700 transmits the CRS while transmitting the data to the UE 702 through the PDSCH.

In step 724, the UE 702 estimates the data transmission channel using the received CRS and receives the data by using the estimated channel. The estimation of the channel by the UE may mean estimation of a channel function H of the transmission channel. For example, a received signal y may be expressed as y=Hx+n, wherein H refers to a channel function, x refers to a transmitted signal, and n refers to noise (including an interference signal).

In FIG. 7, the CSI-RS may have the CSI-RS pattern illustrated in FIG. 5 or 6. For example, if the eNB 700 transmits two CSI-RS symbols through two antenna ports through two contiguous subcarriers in the same time resource. Since the transmission schemes are employed over two contiguous subcarriers in the same time resource, the benefits of CSI-RS pattern application according to the present may be acquired.

Similarly, the CSI-IM may be transmitted through the same pattern as that of the CSI-RS.

In FIG. 7, since the serving eNB transmits for its CSI-IM zero-power CSI-RS in the pattern as shown in FIG. 5 or 6, the benefits of CSI-RS pattern application according to the present disclosure may be acquired.

Figure 8:
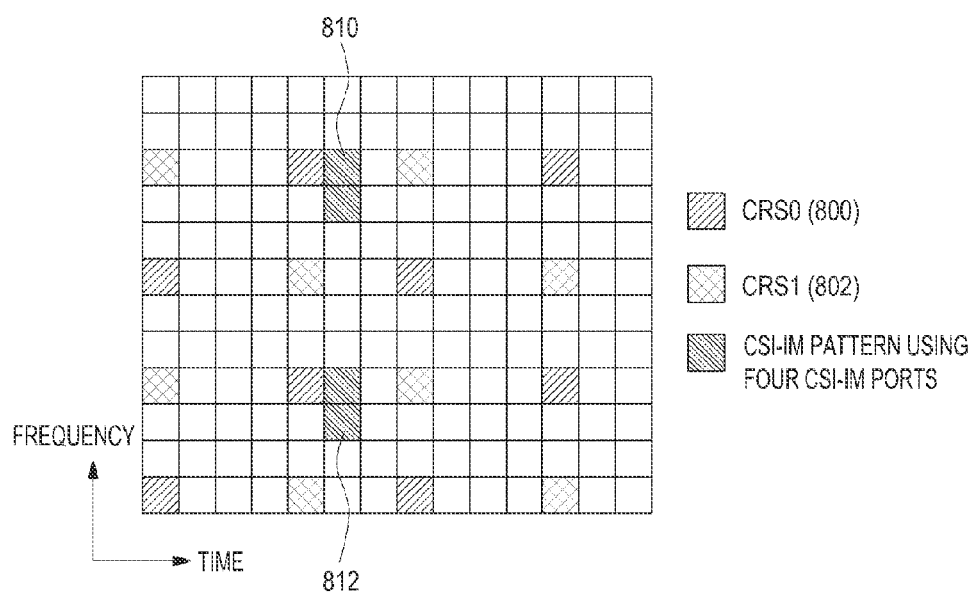
FIG. 8 illustrates an example of a pattern for four CSI-IM ports in an LTE system according to present disclosure.

In FIG. 8, CRS#0 signal 800, CRS#1 signal 802, and CSI-RS symbols 810 and 812 for four CSI-IM ports are transmitted as shown. Referring to the CSI-IM patterns 810 and 812 illustrated in FIG. 8, the CSI-IM symbols span in the frequency axis direction while remaining in the same time resource (i.e., symbol). That is, the CSI-IM signal may be transmitted through the same pattern as that shown for the CSI-RS in FIG. 6. Selectively, an eNB of a neighbor cell may transmit a zero-power CSI-RS in resources.

Figure 9:
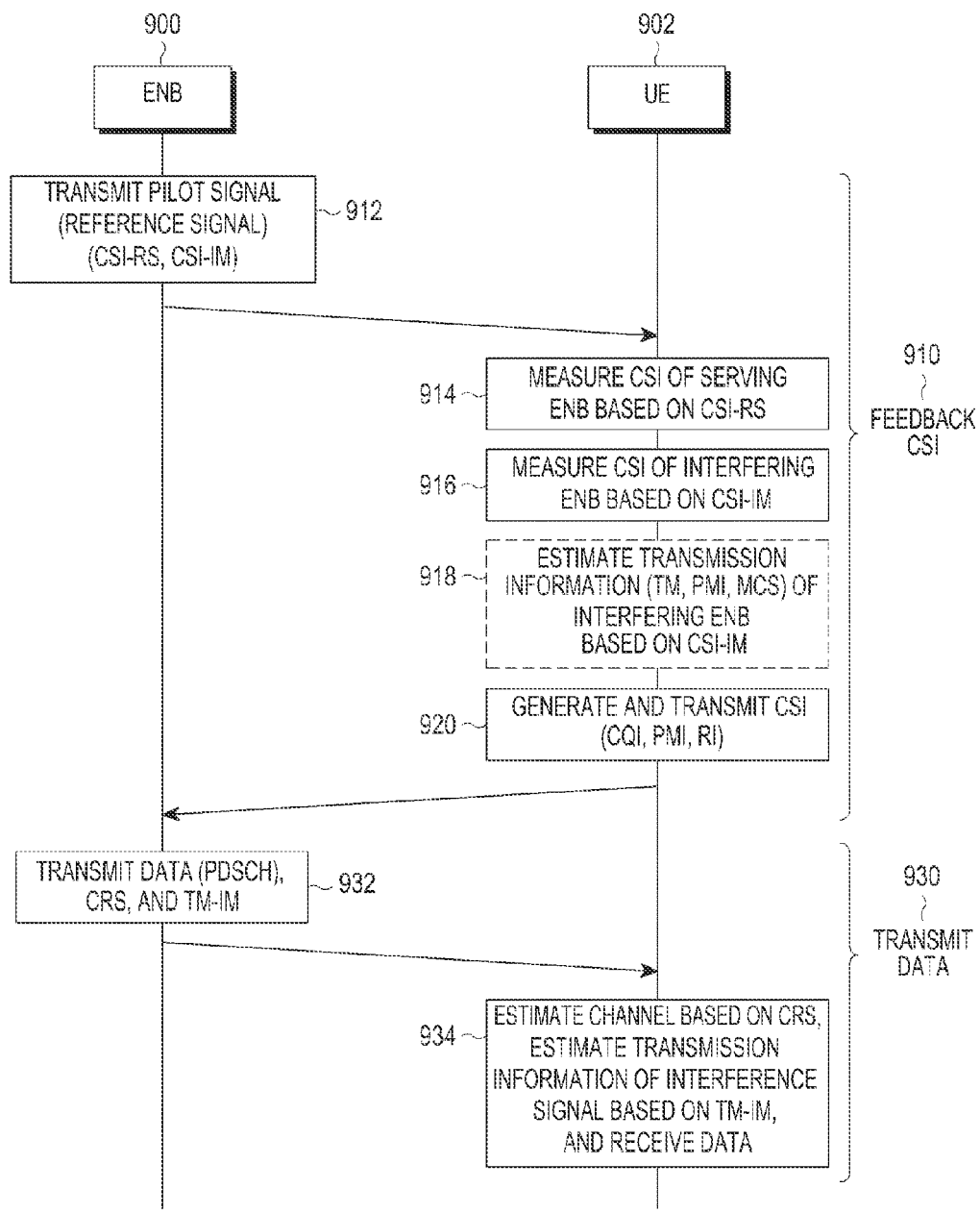
FIG. 9 illustrates an example of operations of an eNB and a UE in a wireless communication system using CSI-RSs of a resource pattern according to the present disclosure and interference signal transmission scheme reference signals.
Figure 11:
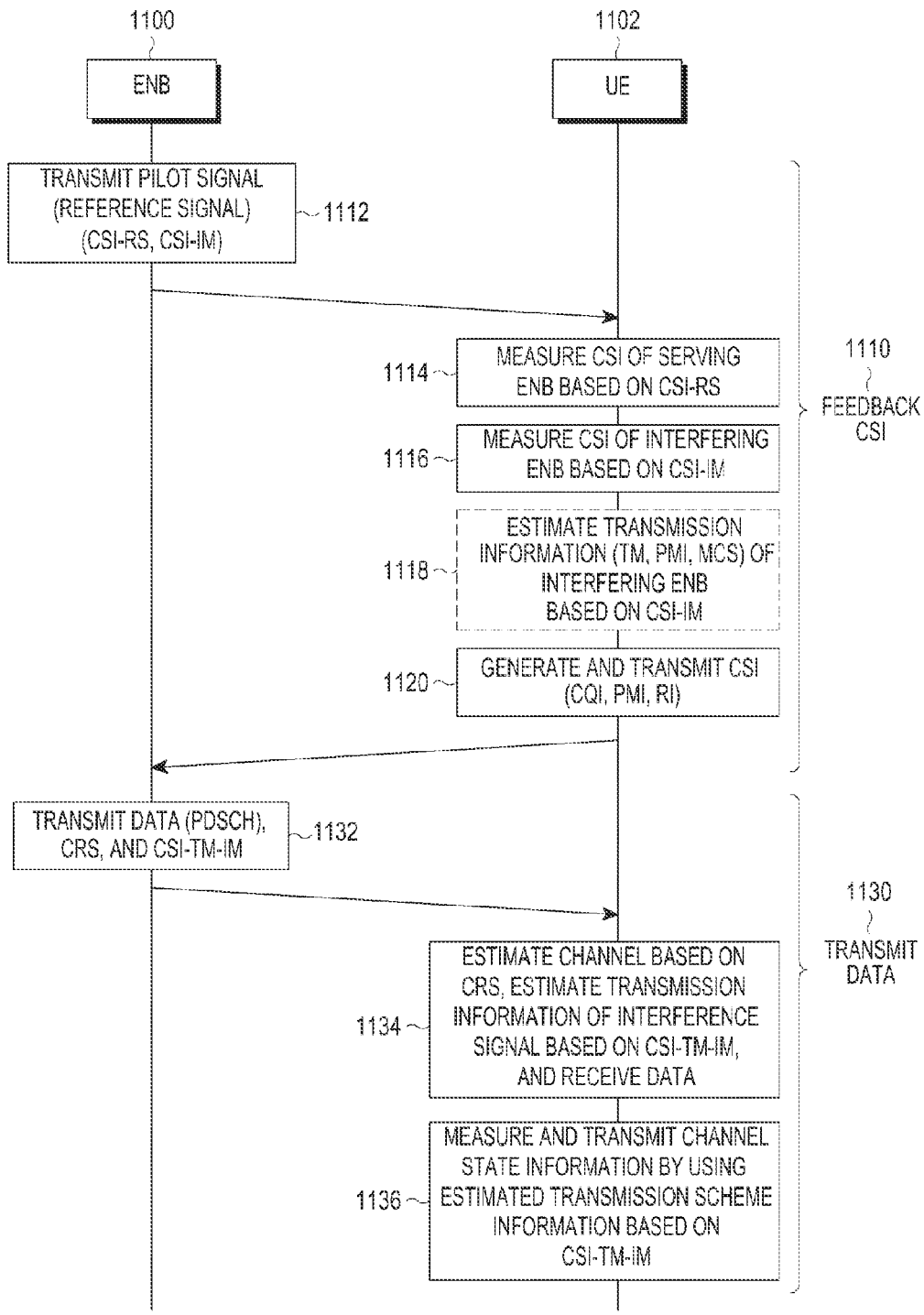
FIG. 11 illustrates an example of operations of an eNB and a UE in a wireless communication system using CSI-RSs of a resource pattern according to the present disclosure and channel state information-interference signal transmission scheme reference signals.

A next generation UE (for example, a UE supporting LTE-A) may remove an interference signal from the received signal in order to reduce packet error of the desired signal. In order to remove the interference signal, the UE may use transmission scheme information as well as channel state information of the interference signal. FIGS. 9 and 11 illustrate examples according to the present disclosure of a method that implements an operation for estimating transmission scheme information of an interference signal by the UE to remove the interference signal.

The present disclosure provides a new reference signal (hereinafter, referred to as a "TM-IM") for estimating interference signal transmission scheme information. The new reference signal TM-IM (Transmission Mode-Interference Measurement) is a reference signal that helps in performing blind detection of transmission scheme information of the cell giving the strongest interference. A UE may estimate transmission scheme information of an interference signal by using the TM-IM transmitted from an eNB 900, and may further reduce a packet error when receiving data by removing the interference signal from the received signal by using the estimated transmission scheme information of the interference signal.

FIG. 9 illustrates an example of operations of the eNB and the UE in a wireless communication system employing TM-IM which uses CSI-RS pattern according to the present disclosure.

Like FIG. 7, the process in FIG. 9 is divided into two parts: a CSI feedback part 910 and a data transmission part 930. In the first part 910, UE 902 feeds back channel state information to eNB 900 using a reference signal transmitted from the eNB 900, and, in the second part 930, eNB 900 transmits downlink data using the channel state information fed back by UE 902 in the first part 910. The operation of FIG. 9 is described below in more detail.

In step 912, eNB 900 transmits a pilot signal (that is, a reference signal) which is used by UE 902 to measure a channel state. The reference signal may be, for example, a CSI-RS or a CSI-IM.

The CSI-RS or CSI-IM may have the CSI-RS pattern illustrated in FIG. 5 or 6.

In step 914, UE 902 measures the channel state of the serving cell (that is, the serving eNB) by using the CSI-RSs transmitted from the eNB 900 in step 912. In step 916, UE 902 measures the channel state of an interfering cell (that is, an interfering eNB) by using the CSI-IM transmitted from the eNB 900.

Unlike step 710 in FIG. 7, as shown by the dotted line box for step 918 in FIG. 9, the UE 902 may estimate transmission scheme information of the interfering cell based on the CSI-IM. In FIG. 9, since the serving eNB transmits for its CSI-IM zero-power CSI-RS in the pattern as shown in FIG. 5 or 6, UE 902 has high probability of estimating the transmission scheme information of the interference signal using the CSI-IM. Such transmission scheme information may include, for example, a Transmission Mode (TM), a PMI, an RI, and an MCS indicating a modulation scheme and a modulation level.

UE 902 generates channel state information (of the serving cell) based on a result of the measurements and feeds back that CSI to the eNB 900 in step 920. The channel state information transmitted to the eNB 900 may include at least one of a CQI, a PMI, and an RI.

In step 932, eNB 900 determines a transmission scheme by using the channel state information and then transmits the CRS and TM-IM while transmitting data to the UE 902 through the PDSCH.

In step 934, UE 902 estimates the data transmission channel by using the CRS and receives the data by using the estimated channel. UE 902 may estimate the channel using a channel function H of the transmission channel. At the same time, UE 902 may estimate transmission scheme information of an interference signal by using the TM-IM, remove the interference signal from the received signal by using the estimated transmission scheme information, and receive data. For example, the transmission scheme information of the interference signal estimated by the UE may be an interference signal parameter such as a Transmission Mode (TM), an RI, a PMI, or an MCS.

In FIG. 9, since the serving eNB transmits for its TM-IM zero-power CSI-RS in the pattern as shown in FIG. 5 or 6, UE 902 has high probability of estimating the transmission scheme information of the interference signal using the TM-IM.

Figure 10:
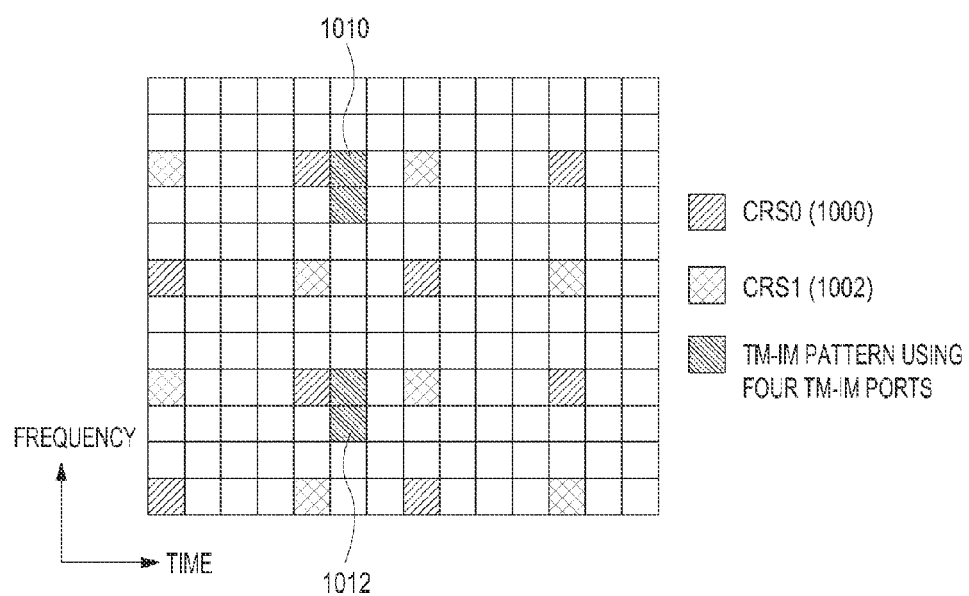
FIG. 10 illustrates an example of a pattern for four TM-IM ports in an LTE system according to present disclosure.

FIG. 10 illustrates an example of a TM-IM pattern for four TM-IM ports in a time-frequency resource grid for one RB defined by fourteen symbols on the time axis and twelve subcarriers on the frequency axis in an LTE system according to present disclosure.

In FIG. 10, CRS#0 signal 1000, CRS#1 signal 1002, and TM-IM symbols 1010 and 1012 for four TM-IM ports are transmitted. Referring to the TM-IM patterns 1010 and 1012 illustrated in FIG. 10, the TM-IM symbols span in a frequency axis direction in the same time resource. That is, the TM-IM signal may be transmitted through the same pattern as that of the CSI-RS.

FIG. 11 illustrates an example of operations of the eNB and the UE in a wireless communication system employing CSI-TM-IM which uses CSI-RSs of a pattern according to the present disclosure.

As mentioned above, the present disclosure provides a new reference signal (hereinafter, referred to as a "CSI-TM-IM") used for estimating channel state information as well as interference signal transmission scheme information. The new reference signal CSI-TM-IM (Channel State Information-Transmission Mode-Interference Measurement) is a reference signal that helps in performing blind detection of transmission scheme information of the interfering cell and helps in measuring channel state information of the interfering cell. A UE may estimate transmission scheme information of the interference signal or measure channel state information by using the CSI-TM-IM transmitted from an eNB. The UE may further reduce a packet error when receiving data by removing the interference signal from the received signal based on the estimated transmission scheme information of the interference signal, and may improve the feedback accuracy by using the estimated channel state information of the interference signal.

The process of FIG. 11 is divided into two parts: CSI feedback part 1110 and data transmission part 1130. The UE 1102 transmits channel state information by using a reference signal transmitted from the eNB 1100 in feedback part 1110, and the eNB 1100 transmits downlink data by using the channel state information in the data transmission part 1130. The operation of FIG. 11 is described below in more detail.

The eNB 1100 transmits a pilot signal (that is, a reference signal) used for measuring a channel state by the UE 1102 in step 1112. The reference signal may be, for example, a CSI-RS or a CSI-IM.

The CSI-RS may have the CSI-RS pattern illustrated in FIG. 5 or 6. Similarly, the CSI-IM may be transmitted through the same pattern as that of the CSI-RS.

In step 1114, UE 1102 measures channel state information of the serving cell (that is, the serving eNB) by using the CSI-RSs transmitted from the eNB 1100. In step 1116, UE 1102 measures channel state information of an interfering cell (that is, an interfering eNB) by using the CSI-IM transmitted from the eNB 1100 and interfering eNBs.

Unlike step 710 in FIG. 7, as shown by the dotted line box for step 1118 in FIG. 11, the UE 1102 estimates transmission scheme information of the interfering cell based on the CSI-IM. In FIG. 11, since the serving eNB transmits for its CSI-IM zero-power CSI-RS in the pattern as shown in FIG. 5 or 6, the UE 1102 has high probability of estimating transmission scheme information of the interference signal through the CSI-IM. The transmission scheme information may include, for example, a Transmission Mode (TM), a PMI, an RI, and an MCS indicating a modulation scheme and a modulation level.

In step 1120, UE 1102 generates channel state information (of the serving cell) based on a result of the measurement and transmits the CSI to the eNB 1100. The channel state information transmitted to the eNB 1100 may include at least one of a CQI, a PMI, and an RI.

In step 1132, eNB 1100 determines a transmission scheme by using the channel state information and transmits the CRS and CSI-TM-IM while transmitting data to the UE 1102 through the PDSCH. Similarly, the CSI-TM-IM may be transmitted through the same pattern as that of the CSI-RS shown in FIGS. 5 and 6.

In step 1134, UE 1102 estimates the data transmission channel by using the CRS and then receives the data by using the estimated channel. UE 1102 may estimate the channel using a channel function H. At the same time, UE 1102 may estimate transmission scheme information of an interference signal by using the CSI-TM-IM, remove the interference signal from the received signal by using the estimated transmission scheme information, and receive data. For example, the transmission scheme information of the interference signal estimated by the UE may be an interference signal parameter such as a Transmission Mode (TM), an RI, a PMI, or an MCS. In FIG. 11, since the serving eNB transmits for its CSI-TM-IM zero-power CSI-RS in the pattern shown in FIG. 5 or 6, UE 1102 has a high probability of estimating the transmission scheme information of the interference signal using the CSI-TM-IM. In addition, the CSI-TM-IM can be further used for estimating CSI as in Feedback CSI. For example, in step 1136, UE 1102 estimates transmission scheme information of the interference signal by using the CSI-TM-IM and determines channel state information to transmit re-feedback. In other words, one CSI-TM-IM can be used for both interference transmission scheme estimation in data reception and CSI in CSI feedback.

Figure 12:
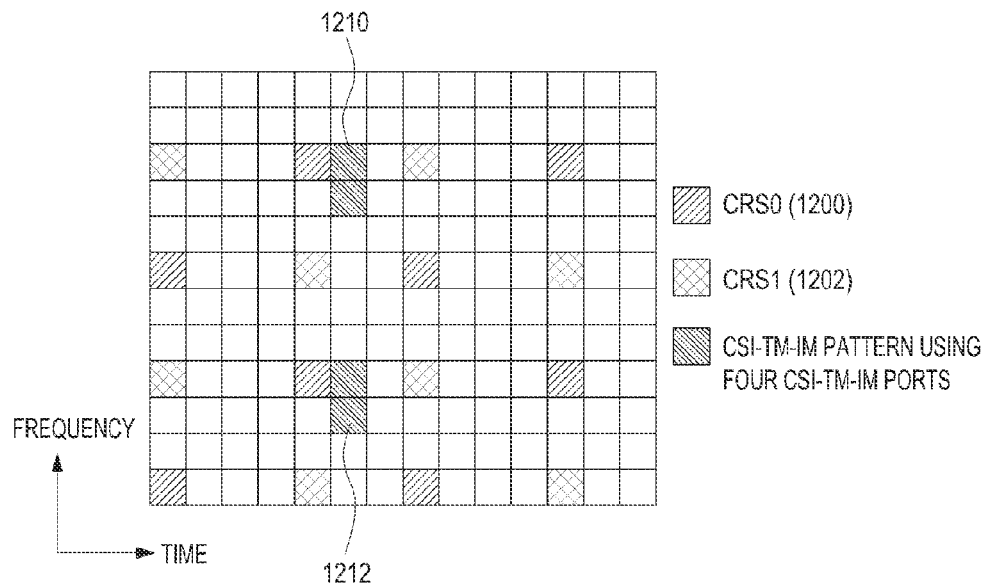
FIG. 12 illustrates an example of a pattern for four CSI-TM-IM ports in an LTE system according to present disclosure.

FIG. 12 illustrates an example of a CSI-TM-IM pattern for four CSI-TM-IM ports in a time-frequency resource grid for one RB defined by fourteen symbols on the time axis and twelve subcarriers on the frequency axis in an LTE system according to present disclosure.

In FIG. 12, CRS#0 signal 1200, CRS#1 signal 1202, and CSI-TM-IM symbols 1210 and 1212 for four CSI-TM-IM ports are transmitted. Referring to the CSI-TM-IM patterns 1210 and 1212 illustrated in FIG. 12, the CSI-TM-IM symbols span in the frequency axis direction in the same time resource. That is, the CSI-TM-IM signal may be transmitted through the same pattern as that of the CSI-RS.

Figure 13:
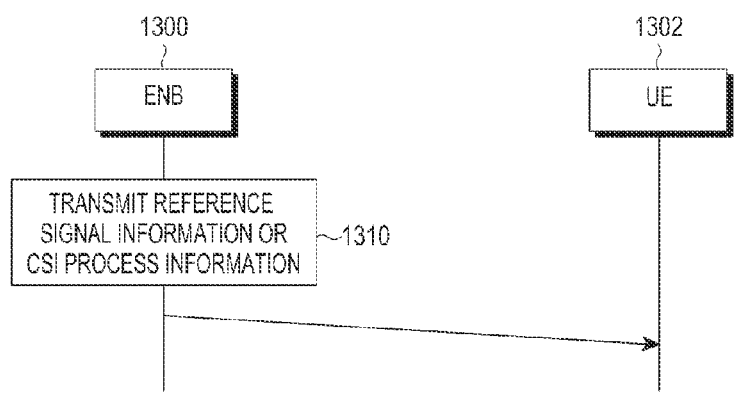
FIG. 13 illustrates an example of a method in which an eNB transmits information for identifying a reference signal and CSI process information to a UE according to the present disclosure.

FIG. 13 illustrates an example of a method in which the eNB transmits information for identifying a reference signal or CSI process information to the UE according to the present disclosure.

As shown in FIG. 13, prior to the operation for transmitting the reference signal and the feedback of the channel state information described in FIGS. 7 to 12, eNB 1300 may transmit reference signal identification information or CSI process information to a UE 1302 in step 1310.

The reference signal identification information corresponds to information indicating, for the UE, at least one of reference signals for channel measurement transmitted based on a pattern according to the present disclosure, that is, a CSI-RS, a CSI-IM, a TM-IM, a CSI-TM-IM, and a zero-power CSI-RS. The reference signal identification information may be transmitted through signaling of a Radio Resource Control (RRC) layer or transmitted through Downlink Control Information (DCI) of a physical layer.

The CSI process information (e.g., for LTE system) corresponds to information indicating at least one reference signal selected from reference signals for channel measurement transmitted based on a pattern according to the present disclosure, that is, a CSI-RS, a CSI-IM, a TM-IM, a CSI-TM-IM, and a zero-power CSI-RS, and positions of resources to be used for transmitting the reference signal. Preferably, the CSI process information may consist of one piece of information including pieces of information on 3 to 4 reference signals that are grouped. The CSI process information may be transmitted through signaling of an RRC layer or transmitted through a DCI of a physical layer.

Figure 14:
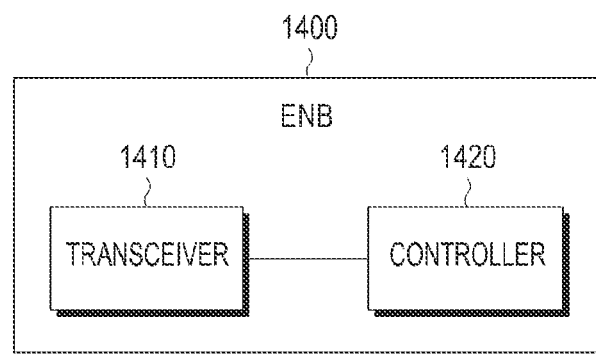
FIG. 14 is a block diagram of an eNB apparatus according to the present disclosure.

FIG. 14 is a block diagram of an eNB apparatus according to the present disclosure.

An eNB apparatus 1400 may include a transceiver 1410 (e.g., RF (radio frequency) chip) which can communicate through signals with a UE, and a controller 1420 (e.g., modem chip) for controlling the transceiver 1410. The transceiver 1410 and the controller 1420 also can be implemented as one component (e.g. chip set).

The controller 1420 is a component for implementing a reference signal and data transmission method performed by the eNB according to the present disclosure. That is, all the operations of the eNB described above may be understood as being implemented by the controller 1420.

Figure 15:
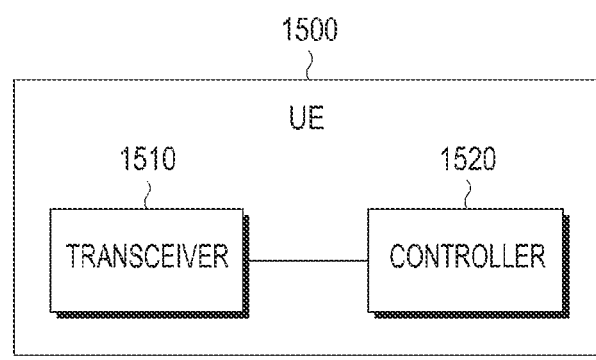
FIG. 15 is a block diagram of a UE apparatus according to the present disclosure.

FIG. 15 is a block diagram of a UE apparatus according to the present disclosure.

A UE apparatus 1500 may include a transceiver 1510 which can communicate through signals with an eNB or another UE, and a controller 1520 for controlling the transceiver 1520. The transceiver 1510 and the controller 1520 also can be implemented as one component.

The controller 1520 is a component for implementing a transmission/reception method of the UE according to the present disclosure. That is, all the operations of the UE described above may be understood as being implemented by the controller 1520.

The system configuration, the example of the time-frequency resource grid, the example of the method, and the block diagram of the apparatus illustrated in FIGS. 1 to 15 do not intend to limit the scope of the present disclosure. That is, all descriptions related to FIGS. 1 to 15, the time-frequency resource grid arrangement, the configuration, or the operation steps should not be construed as necessary elements for implementing the present disclosure, and the present disclosure can be implemented only by using some of the elements without departing from the scope of the present disclosure.

The above described operations may be implemented by providing a memory device storing a corresponding program code to the entity of the communication system, the base station, or any constituent unit of the terminal. That is, a communication system entity, the terminal, the base station, or the controller of the terminal or base station carries out the above described operations by reading and executing the program code stored in a memory device by means of a processor or a central processing unit (CPU).

The various constituent units, modules and the like may be implemented by a hardware circuit, for example, a complementary metal oxide semiconductor based logic circuit, firmware, software, and/or a combination of hardware and the firmware and/or software embedded in a machine readable medium. As an example, various electronic configurations and methods may be carried out by using electric circuits such as transistors, logic gates, and an application specific integrated circuit (ASIC).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method for a user equipment (UE) in a cellular communication system, comprising:
   receiving, through radio resource control (RRC) layer signaling or as downlink control information (DCI), information indicating at least one of a channel state information reference signal (CSI-RS), a zero-power CSI-RS, a CSI-interference measurement (CSI-IM), a first reference signal used for estimating transmission scheme information of an interference signal, and a second reference signal used for estimating transmission scheme information and measuring channel state information of an interference signal;
   receiving the CSI-IM and the CSI-RS transmitted according to a pattern in a frequency-time resource grid, the pattern determined based on a transmission scheme of an evolved NodeB (eNB);
   measuring a state of a transmission channel with the eNB by using the CSI-RS and the CSI-IM;
   generating first channel state information based on the measuring;
   transmitting the first channel state information as feedback to the eNB;
   receiving a downlink signal including data transmitted using a transmission scheme based on the first channel state information, and a cell-specific reference signal (CRS) with the second reference signal from the eNB;
   estimating the transmission channel using the CRS, and the transmission scheme information of the interference signal interfering with the transmission channel using the second reference signal;
   generating second channel state information based on the transmission scheme information of the interference signal estimated using the second reference signal; and
   acquiring, using the estimated channel, data transmitted on the transmission channel,
   wherein the pattern corresponds to a pattern in which two consecutive CSI-RS symbols are transmitted through two consecutive subcarriers on a frequency axis of the time-frequency resource grid if the transmission scheme of the eNB is one of space frequency block codes (SFBC), SFBC-frequency switched transmit diversity (FSTD), and cyclic delay diversity-spatial multiplexing (CDD-SM).

2. The method of claim 1, the CSI-IM is transmitted according to the pattern.

3. The method of claim 1, wherein the first reference signal is transmitted according to the pattern, further comprising:
   estimating the transmission scheme information of the interference signal by using the first reference signal and removing the interference signal from a downlink signal by using the estimated transmission scheme information of the interference signal.

4. The method of claim 1, wherein the second reference signal is transmitted according to the pattern, further comprising:
   removing the interference signal from a downlink signal by using the estimated transmission scheme information of the interference signal; and
   transmitting the second channel state information as re-feedback.

5. The method of claim 1, wherein the channel state information includes at least one of a channel quality indicator (CQI) indicating a modulation and coding scheme (MCS), a rank indicator (RI), and a precoding matrix indicator (PMI).

6. The method of claim 3, wherein the transmission scheme information of the interference signal estimated using the first reference signal includes at least one of parameters of the interference signal such as a transmission mode (TM), a precoding matrix indicator (PMI), a rank indicator (RI), and a modulation level (MOD).

7. The method of claim 1, further comprising, before receiving the information indicating at least one of a CSI-RS, a zero-power CSI-RS, a CSI-IM, a first reference signal, and a second reference signal:
   receiving information indicating a CSI process about at least one of the CSI-RS, the CSI-IM, the first reference signal used for estimating transmission scheme information of an interference signal, and the second reference signal used for estimating transmission scheme information and measuring channel state information of an interference signal,
   wherein the CSI-RS, the CSI-IM, the first reference signal, and the second reference signal are transmitted according to the pattern.

8. A method for an evolved NodeB (eNB) in a cellular communication system, comprising:
   transmitting, through radio resource control (RRC) layer signaling or as downlink control information (DCI, information indicating at least one of a channel state information reference signal (CSI-RS), a zero-power CSI-RS, a CSI-interference measurement (CSI-IM), a first reference signal used for estimating transmission scheme information of an interference signal, and a second reference signal used for estimating transmission scheme information and measuring channel state information of an interference signal;
   transmitting the CSI-IM and the CSI-RS to a user equipment (UE) according to a pattern in a time-frequency resource grid determined based on a transmission scheme of the eNB;
   receiving first channel state information of the UE generated using the CSI-RS and the CSI-IM;
   transmitting a downlink signal including data using a transmission scheme based on the first channel state information, and a cell-specific reference signal (CRS) with the second reference signal; and
   receiving second channel state information generated based on the transmission scheme information of the interference signal estimated using the second reference signal,
   wherein the pattern corresponds to a pattern in which two consecutive CSI-RS symbols are transmitted through two consecutive subcarriers on a frequency axis of the time-frequency resource grid if the transmission scheme of the eNB is one of space frequency block codes (SFBC), SFBC-frequency switched transmit diversity (FSTD), and cyclic delay diversity-spatial multiplexing (CDD-SM).

9. The method of claim 8, wherein the CSI-IM is transmitted according to the pattern.

10. The method of claim 8, wherein the first reference signal is transmitted according to the pattern.

11. The method of claim 8, wherein the second reference signal is transmitted according to the pattern.

12. The method of claim 8, wherein the channel state information includes at least one of a channel quality indicator (CQI) indicating a modulation and coding scheme (MCS), a rank indicator (RI), and a precoding matrix indicator (PMI).

13. The method of claim 10, wherein the transmission scheme information of the interference signal estimated using the first reference signal includes at least one of parameters of the interference signal such as a transmission mode (TM), a precoding matrix indicator (PMI), a rank indicator (RI), and a modulation level (MOD).

14. The method of claim 8, further comprising, before transmitting the information indicating at least one of a CSI-RS, a zero-power CSI-RS, a CSI-IM, a first reference signal, and a second reference signal:
    transmitting information indicating a CSI process about at least one of the CSI-RS, the CSI-IM, the first reference signal used for estimating transmission scheme information of an interference signal, and the second reference signal used for estimating transmission scheme information and measuring channel state information of an interference signal,
    wherein the CSI-RS, the CSI-IM, the first reference signal, and second reference signal are transmitted according to the pattern.

15. A user equipment (UE) in a cellular communication system, comprising:
    a transceiver; and
    a controller coupled to the transceiver, wherein the controller is configured to:
        receive, through radio resource control (RRC) layer signaling or as downlink control information (DCI), information indicating at least one of a channel state information reference signal (CSI-RS), a zero-power CSI-RS, a CSI-interference measurement (CSI-IM), a first reference signal used for estimating transmission scheme information of an interference signal, and a second reference signal used for estimating transmission scheme information and measuring channel state information of an interference signal,
        receive the CSI-IM and the CSI-RS transmitted according to a pattern in a time-frequency resource grid determined based on a transmission scheme of an evolved NodeB (eNB),
        measure a state of a transmission channel with the eNB by using the CSI-RS and the CSI-IM,
        generate first channel state information based on the measuring,
        transmit the channel state information as feedback to the eNB,
        receive a downlink signal including data transmitted using a transmission scheme based on the first channel state information, and a cell-specific reference signal (CRS) with the second reference signal from the eNB,
        estimate the transmission channel using the CRS, and the transmission scheme information of the interference signal using the second reference signal,
        generate second channel state information based on the transmission scheme information of the interference signal estimated using the second reference signal, and
        acquire, using the estimated channel, data transmitted on the transmission channel,
    wherein the pattern corresponds to a pattern in which two consecutive CSI-RS symbols are transmitted through two consecutive subcarriers on a frequency axis of the time-frequency resource grid if the transmission scheme of the eNB is one of space frequency block codes (SFBC), SFBC-frequency switched transmit diversity (FSTD), and cyclic delay diversity-spatial multiplexing (CDD-SM).

16. An evolved NodeB (eNB) in a cellular communication system, comprising:
    a transceiver; and
    a controller coupled to the transceiver, wherein the controller is configured to:
        transmit, through radio resource control (RRC) layer signaling or as downlink control information (DCI), information indicating at least one of a channel state information reference signal (CSI-RS), a zero-power CSI-RS, a CSI-interference measurement (CSI-IM), a first reference signal used for estimating transmission scheme information of an interference signal, and a second reference signal used for estimating transmission scheme information and measuring channel state information of an interference signal,
        transmit the CSI-IM and the CSI-RS to a user equipment (UE) according to a pattern in a time-frequency resource grid determined based on a transmission scheme of the eNB,
        receive first channel state information of the UE generated using the CSI-RS and the CSI-IM,
        transmit a downlink signal including data using a transmission scheme based on the first channel state information, and a cell-specific reference signal (CRS) with the second reference signal, and
        receive second channel state information generated based on the transmission scheme information of the interference signal estimated using the second reference signal,
    wherein the pattern corresponds to a pattern in which two consecutive CSI-RS symbols are transmitted through two consecutive subcarriers on a frequency axis of the time-frequency resource grid if the transmission scheme of the eNB is one of space frequency block codes (SFBC), SFBC-frequency switched transmit diversity (FSTD), and cyclic delay diversity-spatial multiplexing (CDD-SM).

17. A chip set for a user equipment (UE) in a cellular communication system configured to:
    receive, through radio resource control (RRC) layer signaling or as downlink control information (DCI), information indicating at least one of a channel state information reference signal (CSI-RS), a zero-power CSI-RS, a CSI-interference measurement (CSI-IM), a first reference signal used for estimating transmission scheme information of an interference signal, and a second reference signal used for estimating transmission scheme information and measuring channel state information of an interference signal;
    receive the CSI-IM and the CSI-RS transmitted according to a pattern in a frequency-time resource grid, the pattern determined by an evolved NodeB (eNB) based on a transmission scheme;
    measure a state of a transmission channel with the eNB by using the CSI-RS and the CSI IM;
    generate first channel state information based on the measuring;
    transmit the first channel state information as feedback to the eNB;
    receive a downlink signal including data transmitted using a transmission scheme based on the first channel state information, and a cell-specific reference signal (CRS) with the second reference signal from the eNB;

estimate the transmission channel using the CRS and the transmission scheme information of the interference signal using the second reference signal;

generate second channel state information based on the transmission scheme information of the interference signal estimated using the second reference signal; and acquire, using the estimated channel, data transmitted on the transmission channel, wherein the pattern corresponds to a pattern in which two consecutive CSI-RS symbols are transmitted through two consecutive subcarriers on a frequency axis of the time-frequency resource grid if the transmission scheme of the eNB is one of space frequency block codes (SFBC), SFBC-frequency switched transmit diversity (FSTD), and cyclic delay diversity-spatial multiplexing (CDD-SM).

18. A chip set for an evolved NodeB (eNB) in a cellular communication system configured to:

transmit information indicating at least one of a channel state information reference signal (CSI-RS), a zero-power CSI-RS, a CSI-interference measurement (CSI-IM), a first reference signal used for estimating transmission scheme information of an interference signal, and a second reference signal used for estimating transmission scheme information and measuring channel state information of an interference signal, through radio resource control (RRC) layer signaling or as downlink control information (DCI);

transmit the CSI-IM and the CSI-RS to a user equipment (UE) according to a pattern in a time-frequency resource grid determined based on a transmission scheme of the eNB;

receive first channel state information of the UE generated using the CSI-RS and the CSI-IM;

transmit a downlink signal including data using a transmission scheme based on the first channel state information, and a cell-specific reference signal (CRS) with the second reference signal; and receive second channel state information generated based on the transmission scheme information of the interference signal estimated using the second reference signal, wherein the pattern corresponds to a pattern in which two consecutive CSI-RS symbols are transmitted through two consecutive subcarriers on a frequency axis of the time-frequency resource grid if the transmission scheme of the eNB is one of space frequency block codes (SFBC), SFBC-frequency switched transmit diversity (FSTD), and cyclic delay diversity-spatial multiplexing (CDD-SM).

19. The method of claim 2, wherein the CSI-IM is transmitted by zero-power CSI RS according to the pattern.

20. The method of claim 9, wherein the CSI-IM is transmitted by zero-power CSI RS according to the pattern.

* * * * *